(12) United States Patent
Cacas

(10) Patent No.: US 7,356,414 B2
(45) Date of Patent: Apr. 8, 2008

(54) SEISMIC IMAGE DEFORMATION METHOD FOR IMPROVED INTERPRETATION

(75) Inventor: Marie-Christine Cacas, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 179 days.

(21) Appl. No.: 11/156,472

(22) Filed: Jun. 21, 2005

(65) Prior Publication Data

US 2006/0004522 A1 Jan. 5, 2006

(30) Foreign Application Priority Data

Jun. 21, 2004 (FR) .................................. 04 06879

(51) Int. Cl.
*G06F 19/00* (2006.01)
*G06F 7/60* (2006.01)

(52) U.S. Cl. ............................................. 702/14; 703/2
(58) Field of Classification Search .................. 702/14, 702/2, 5, 11, 12, 13, 17; 367/73; 703/10, 703/2; 382/109

See application file for complete search history.

(56) References Cited

U.S. PATENT DOCUMENTS

| 4,679,174 | A | | 7/1987 | Gelfand | |
| 5,148,494 | A | * | 9/1992 | Keskes | 382/109 |
| 5,798,768 | A | * | 8/1998 | Cacas | 345/441 |
| 5,844,799 | A | * | 12/1998 | Joseph et al. | 702/2 |
| 6,070,125 | A | * | 5/2000 | Murphy et al. | 702/11 |
| 6,246,963 | B1 | | 6/2001 | Cross et al. | |
| 6,597,995 | B1 | * | 7/2003 | Cornu et al. | 702/17 |
| 6,771,800 | B2 | * | 8/2004 | Keskes et al. | 382/109 |
| 7,117,091 | B2 | * | 10/2006 | Masson et al. | 702/5 |
| 7,151,845 | B2 | * | 12/2006 | Hu | 382/109 |

FOREIGN PATENT DOCUMENTS

EP 0 632 293 A2 1/1995

OTHER PUBLICATIONS

Sarg et al., Integrated Seismic Analysis of carbonate reservoirs: From the Framework to the Volume Attributes, Jul. 2003, The Leading Edge, pp. 640-645.*
French International Search Report dated Jan. 20, 2005.

* cited by examiner

*Primary Examiner*—John E. Barlow, Jr.
*Assistant Examiner*—Toan M. Le
(74) *Attorney, Agent, or Firm*—Antonelli, Terry, Stout & Kraus, LLP.

(57) ABSTRACT

The present invention is a method of geometric deformation of a seismic image for interpretation. The method includes selecting a geologic layer represented in the seismic image determining by stratigraphic modeling a mean topographic depositional surface for said layer deforming the seismic image by displaying the traces by taking account of the modeled mean depositional surface; and carrying out a geologic interpretation of the image thus deformed.

6 Claims, 2 Drawing Sheets

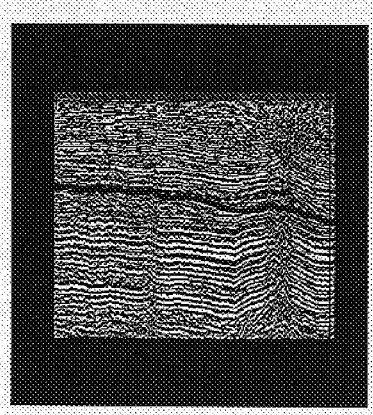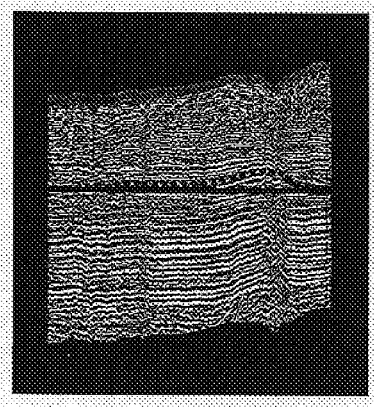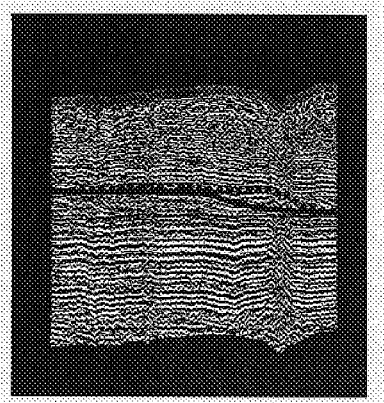

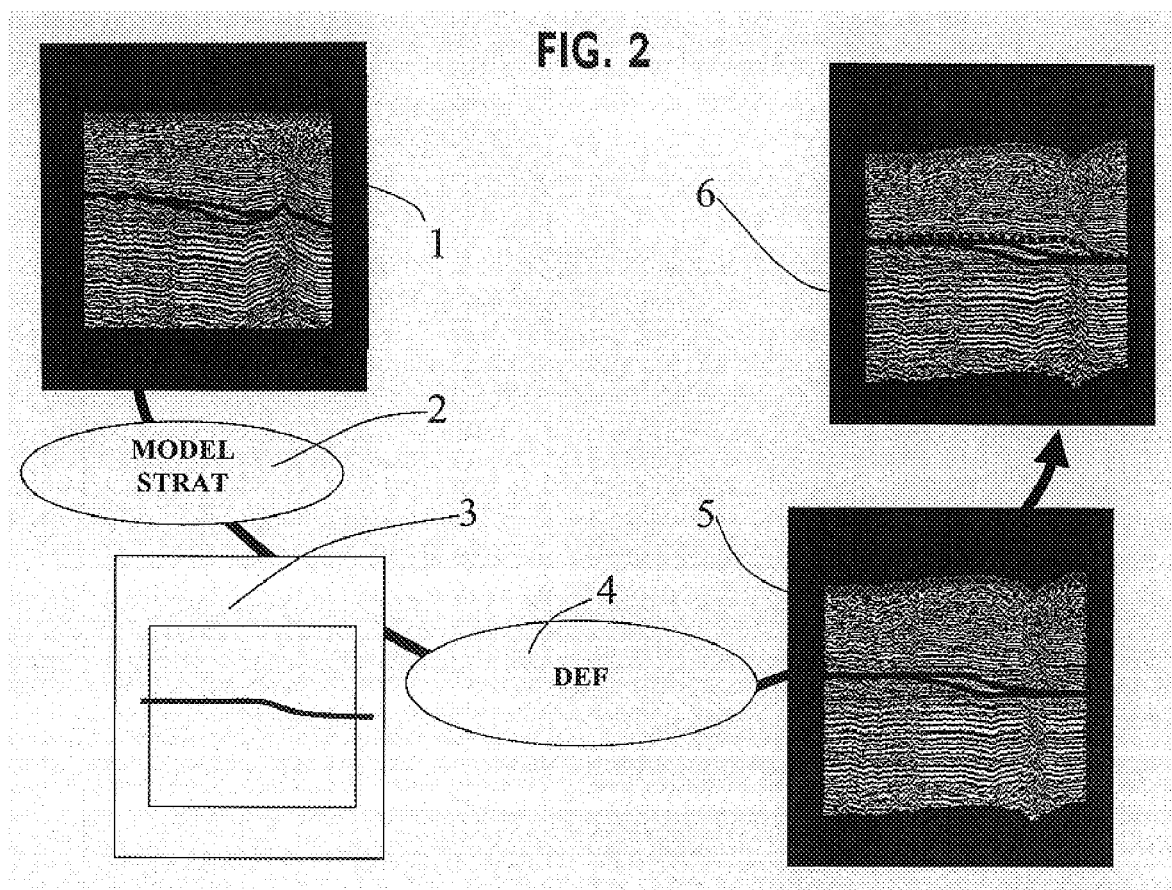

SEISMIC IMAGE DEFORMATION METHOD FOR IMPROVED INTERPRETATION

BACKGROUND OF THE INVENTION

1. Field of the Invention

The present invention relates to a method for geometric deformation of a seismic image in order to eliminate the effect of the deformations undergone by the subsoil after its deposition. The method applies to the interpretation of seismic sections or cubes. It relates to the geometric deformation of a seismic image (section or cube) in order to make the seismic interpreter's work simpler and to allow easier interpretation control. The data handled are the seismic depth images, cube or section, and characteristic surfaces (or horizons) obtained by picking on the seismic images themselves. Without geometric transformation, these seismic images and these surfaces correspond to a current state of the subsoil and not to its state at the geologic time of deposition of these surfaces. In fact, the subsoil undergoes considerable deformations during the geologic times that follow its deposition.

2. Description of the Prior Art

The geometric transformation of an image by means of a computer procedure is an operation that nowadays does not pose technical problems. However, the characterization of the parameters of geometric transformation remains in some cases a difficult operation.

In the field of interpretation of seismic images notably, two types of transformation are available to users:

1. "Flattening" of the horizons: Flattening carries out a translation of the seismic traces making up the seismic image, parallel to their axis, that is vertically, in order to reposition the traces so that their intersection with a geologic surface located along the traces is placed horizontal. This procedure is explained in FIG. 1b. It restores the image of the subsoil at the time of its deposition, provided that the topography at the time is absolutely horizontal.

2. Restoration. Restoration is performed by:
   manually splitting the image into pieces;
   performing geometric transformations of each piece individually; and then
   reconstructing the total image by displacing the pieces, (as if putting the pieces of a jigsaw puzzle together again). For example, the Baliss and EasyDepth softwares from the Beicip-Franlab company can perform reconstruction.

The parameters of these various operations are entirely determined by the user.

In addition to the seismic image deformation techniques, the emergence of stratigraphic modelling can also be noted, with a goal to better apprehend the geometric (but also sedimentologic) structure of the subsoil, as well as its evolution during geologic times. These techniques may remain quite delicate to implement, but a recent evolution, described in document French Patent Application 03/11,194, which corresponds to U.S. Pat. No. 7,117,091, allows direct calculation of an estimation of the regional topography at the time of the deposition of a given sediment layer, from the thickness of this layer, that can be read on the seismic image.

SUMMARY OF THE INVENTION

The method of the invention deforms the seismic image by translation of the seismic traces along their axis, as in the case of "flattening", but in such a way that the intersection of the traces with a geologic surface located along them is placed on a surface (referred to as "target surface") representing the topography at the time of its deposition, and not a perfectly horizontal surface, as in the case of "flattening". This depositional surface (target surface) is obtained by stratigraphic modelling, such as that based on a "stationary diffusion" type principle, explained in the above-referenced French Patent Application 03/11,194.

The present invention thus relates to a method of geometric deformation of a seismic image for interpretation, comprising the steps:

selecting a geologic layer represented in the seismic image;

determining, by stratigraphic modelling, a mean topographic depositional surface for the layer;

deforming the seismic image by displacing traces by accounting for a modelled mean depositional surface; and carrying out a geologic interpretation of the image thus deformed.

In the method, statigraphic modelling can be based on the principle of monolithologic stationary diffusion.

The geologic layer is defined by a top and a base thereof with, the top being adjustable on the mean surface.

In a variation of the invention, the base can be adjusted on the mean surface.

The method first calculates an estimation of the topography at the time of the formation of the sedimentary layer during interpretation, by means of a stratigraphic modelling procedure, then in carrying out a geometric transformation of the seismic image and of the horizons during analysis, in order to restore the layer in a state close to the original state at the time of their formation.

This method makes the interpreter's work easier by saving accounting for the effect of the geologic deformations undergone by the subsoil after its deposition, during interpretation.

This method can advantageously apply to the interpretation of seismic data for research and notably for hydrocarbon reservoir characterization.

BRIEF DESCRIPTION OF THE DRAWINGS

Other features and advantages of the method according to the invention will be clear from reading the description given hereafter, with reference to the accompanying figures wherein:

FIG. 1a shows a raw seismic image;

FIG. 1b shows the "flattening" principle according to the prior art;

FIG. 1c shows the principle according to the invention; and

FIG. 2 illustrates more precisely the sequence of steps according to the invention.

DETAILED DESCRIPTION OF THE INVENTION

FIGS. 1a, 1b and 1c illustrate the significance of the present method in relation to the conventional "flattening" method.

FIG. 1a shows the raw image of a seismic section obtained in a carbonate platform growth environment. The dotted line shows the horizon during picking and its relative position in relation to an earlier deposited surface represented by the full line. It is well known that picking is made difficult by the deformations undergone by the subsoil after deposition of these surfaces. In fact, the image is deformed in relation to what it was at the time of the accumulation of these sediments. This deformation consequently blurs the current geometric structure in relation to the reference scheme of the carbonate platform growth contexts known to the interpreter.

FIG. 1b shows the same seismic image after "flattening" of the full line representing an earlier deposited surface. The image thus deformed does not represent a geologic reality and it can mislead the interpreter since the surface to be picked then appears as a mound erected on a horizontal plain, and not as a growth increment of a carbonate platform.

FIG. 1c shows the same image after translation of the traces according to the method of the invention. Translation of the traces is achieved here so as to adjust the full line on a line representing the topographic surface at the time of the deposition. This surface is obtained by calculations by means of a stratigraphic modelling method based, for example, on the stationary diffusion principle, as mentioned above. In the image thus transformed, the horizon to be picked (dotted line) has a morphology that is typical of a carbonate growth, close to reality and readily identifiable by a geologist.

The data handled:

1. A seismic image is a set of adjoining seismic traces. This image can be a surface (it is a seismic section in this case) or a volume (seismic cube) image.

2. Horizons are characteristic surfaces located in the seismic image and corresponding to the lower surface ("base") and to the upper surface ("top") of the sedimentary layers forming the subsoil zone studied. These horizons delimit geologic layers.

It shall be noted that the seismic images and the horizons concerned by the method according to the invention have to be expressed in the "depth" domain. If the seismic images and horizon are expressed in the "time" domain, conversion has to be carried out prior to implementing the method according to the invention. This conversion can be performed using one of the many techniques available to interpreters.

3. The specific parameters required for implementation of the stratigraphic modelling. In the non limitative case where the stratigraphic modelling used is based on the monolithologic stationary diffusion, these parameters are:

Two diffusion coefficients Km and Kc characterizing the aggressivity of the erosive phenomena in marine and continental environments respectively, estimated at the time of the deposition;

estimation of the depth point relative to the marine environment at the time of the deposition of the various geologic layers of the environment, at any point selected by the user; and estimation of the spatial distribution of the sediment supply at the boundaries of the subsoil zone represented in the seismic image, during the time intervals required for the deposition of each geologic layer.

The procedure comprises a sequence of at least three steps, illustrated by FIG. 2:

The first step selects a sedimentary layer for which a top and a base are defined. The top and the base are generally directly obtained from picking on the seismic image. Representation 1 in FIG. 2 shows the two base and top lines of the layer considered.

The mean topographic surface applicable during the period required for deposition of the sedimentary layer selected is then calculated. This calculation is carried out by means of a computerized stratigraphic modelling procedure MODEL START bearing reference number 2. According to the modelling method selected, it may be necessary for the top and the base to be entirely defined. Using an interpolator is then necessary to estimate these surfaces in the zones where picking has not been performed. There are many methods for carrying out this interpolation, which are generally available on the seismic interpretation stations. The mean representation line resulting from this modelling is illustrated by image 3.

The last step deforms (stage DEF bearing reference number 4) the seismic image so as to adjust the top (or the base, depending on the interpreter's preference) of the sedimentary layer selected on the mean topographic surface calculated in the previous stage. The illustration bearing reference number 5 shows, after deformation, the image of the layer selected (initially represented by image 1) in deposition position. It is clear, in this example, that interpretation is considerably facilitated. The image bearing reference number 6 shows a dotted picking line of another sequence, a picking that can now be carried out more easily by means of the deformation method according to the invention.

The invention claimed is:

1. A method of geometric deformation of a seismic image for interpretation, comprising:
   selecting a geologic layer represented in the seismic image;
   determining by stratigraphic modelling a mean topographic depositional surface for the layer;
   deforming the seismic image by displacing the traces by accounting for the modelled mean depositional surface; and
   carrying out a geologic interpretation of the deformed image.

2. A method as claimed in claim 1, wherein said stratigraphic modelling is based on a principle of monolithologic stationary diffusion.

3. A method as claimed in claim 1 wherein, the layer is defined by a top and a base thereof, the top being adjusted on the mean surface.

4. A method as claimed in claim 1 wherein, the layer is defined by a top and a base thereof with, the base being adjusted on the mean surface.

5. A method as claimed in claim 2, wherein the layer is defined by a top and a base thereof with the top being adjusted on the mean surface.

6. A method as claimed in claim 2, wherein the layer is defined by a top and a base thereof with the base being adjusted on the mean surface.

* * * * *